(12) United States Patent
Simske

(10) Patent No.: US 7,234,106 B2
(45) Date of Patent: Jun. 19, 2007

(54) SYSTEM FOR AND METHOD OF GENERATING IMAGE ANNOTATION INFORMATION

(76) Inventor: Steven J. Simske, 3724 Rochdale Dr., Fort Collins, CO (US) 80525

( * ) Notice: Subject to any disclaimer, the term of this patent is extended or adjusted under 35 U.S.C. 154(b) by 838 days.

(21) Appl. No.: 10/238,126

(22) Filed: Sep. 10, 2002

(65) Prior Publication Data

US 2004/0049734 A1 Mar. 11, 2004

(51) Int. Cl.
*G06N 3/00* (2006.01)
(52) U.S. Cl. .................................... 715/512
(58) Field of Classification Search ............... 715/500, 715/512, 513, 517, 523, 530; 345/634
See application file for complete search history.

(56) References Cited

U.S. PATENT DOCUMENTS

| | | | |
|---|---|---|---|
| 5,550,965 A * | 8/1996 | Gabbe et al. ............... 715/512 |
| 5,600,775 A * | 2/1997 | King et al. ................. 715/500 |
| 6,151,426 A | 11/2000 | Lee et al. |
| 6,208,353 B1 * | 3/2001 | Ayer et al. ................. 345/634 |
| 6,222,985 B1 | 4/2001 | Miyake |
| 6,351,321 B1 | 2/2002 | McIntyre et al. |
| 6,389,181 B2 | 5/2002 | Shaffer et al. |
| 6,690,883 B2 * | 2/2004 | Pelletier ..................... 396/321 |

FOREIGN PATENT DOCUMENTS

| | | |
|---|---|---|
| CA | 2 398 385 | 4/2001 |
| EP | 122985 A2 | 8/2002 |
| WO | WO 00/07110 | 2/2000 |
| WO | WO 01/16680 | 3/2001 |
| WO | WO 02/54221 | 7/2002 |

\* cited by examiner

*Primary Examiner*—Stephen Hong
*Assistant Examiner*—Kyle R. Stork

(57) ABSTRACT

The present invention is directed to a system for and method of generating image annotation information comprising selecting images to be annotated, analyzing said selected images to identify associated information, generating annotation information from at least one of said selected images using said associated information, and annotating said selected images with the annotation information.

20 Claims, 3 Drawing Sheets

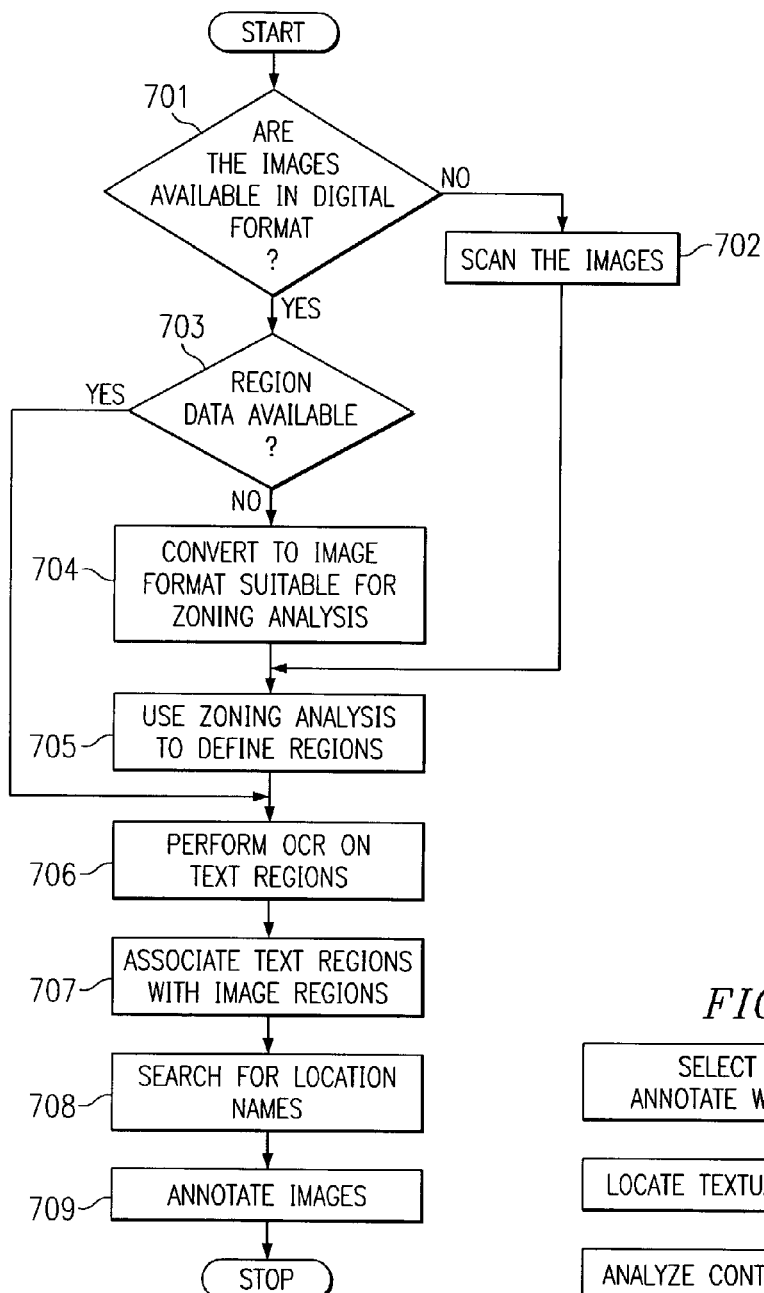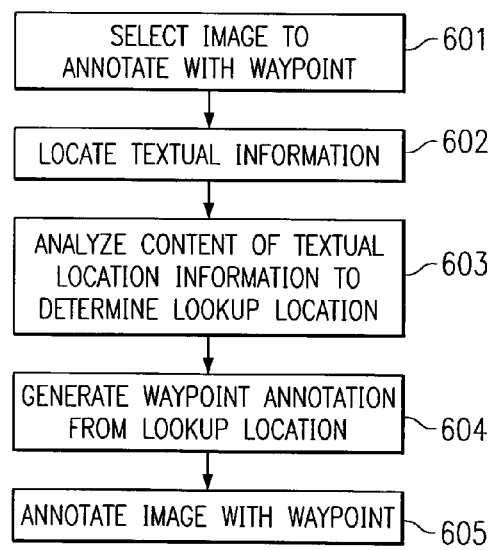

SYSTEM FOR AND METHOD OF GENERATING IMAGE ANNOTATION INFORMATION

FIELD OF THE INVENTION

The present invention is generally related to the cataloging of images and more particularly to generation of image annotation information.

DESCRIPTION OF RELATED ART

Images and image data may be captured or stored in both digital and non-digital image data forms. Digital image data may be directly generated by equipment, such as digital cameras and video recorders, or may result from the conversion of non-digital image sources, such as photographs, to digital information using scanner-like devices. Frequently, digital image data will also contain text or language information, often called tagging data or metadata, in addition to image-specific information, particularly if the image data was derived from scanned sources such as magazine pages or similar documents.

Organized image data is often required for many applications, and appropriately cataloged and organized images are desirable even for home photographers wishing to preserve and annotate their pictures. Image data may be catalogued and indexed using appropriate data file names and folders or may be directly labeled with descriptive information using various image editing programs. Both of these methods require extensive user input to select or create the descriptive information needed to label the image.

Manual editing of image data may be time consuming, particularly if many images must be edited or if the user employs image processing equipment with slow processing speeds. Manual organization, indexing and cataloging of the image data requires much user attention.

BRIEF SUMMARY OF THE INVENTION

The present invention is directed to a system for and method of generating image annotation information comprising selecting images to be annotated, analyzing said selected images to identify associated information, generating annotation information from at least one of said selected images using said associated information, and annotating said selected images with the annotation information.

An embodiment of the invention is directed to a system for generating annotated images comprising means for selecting images to be annotated, means for analyzing said selected images to identify associated information, means for generating annotation information for at least one selected image using said associated information, means for matching generated annotation information with selected images, and means for annotating images with generated annotation information.

In an alternative embodiment, the invention is directed to computer-executable software code that is stored on a computer-readable medium, said computer-executable software code comprising code for selecting images to be annotated, code for identifying associated information in at least one selected image, code for generating annotation information using said associated information, code for matching annotation information with images to be annotated, and code for annotating images.

BRIEF DESCRIPTION OF THE DRAWINGS

FIG. 6 shows a block diagram of the steps for a method of automatically selecting waypoint information for annotating an image according to one embodiment of the present invention; and FIG. 7 shows a flow diagram for annotating images with waypoint information according to one embodiment of the invention.

DETAILED DESCRIPTION

Figure 1:
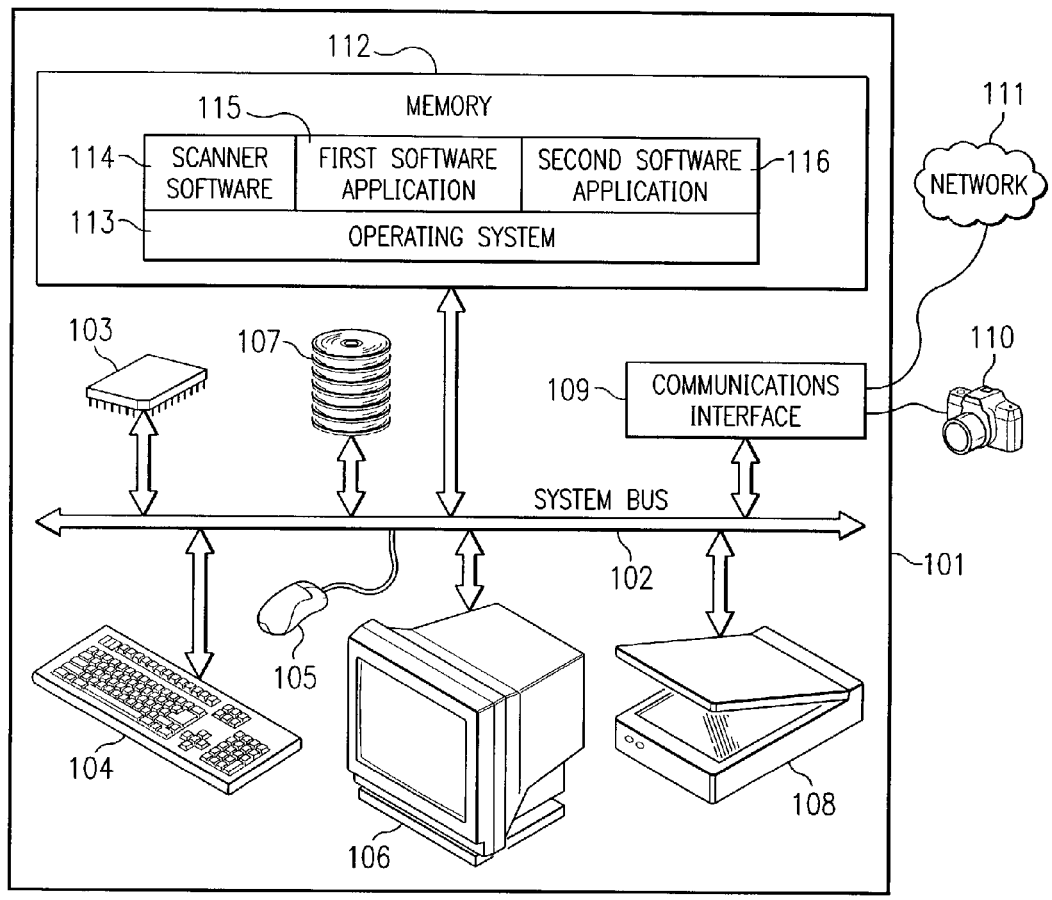
FIG. 1 depicts a diagram of one embodiment of an apparatus for automatically generating image annotation information according to the present invention.

FIG. 1 is a diagram of one embodiment of an apparatus for automatically generating image annotation information according to the present invention. Computer system 101 has a system bus 102, that allows communication between various elements of computer system 101. Computer system 101 also includes processor 103, keyboard 104, and pointing device such as mouse 105 that allow user input. Computer system 101 communicates information to the user through monitor 106. Storage 107 may be used to store programs and data used by computer system 101. Scanner 108 or other digital image capture device for generating image data may also be attached to system bus 102. A communications interface 109 allows communication between system bus 102 and image acquisition devices such as digital camera 110 and/or a computer network 111. The computer system also may comprise memory 112 that is attached to system bus 102. Memory 112 may contain operating system 113 and programs such as scanner software 114. Memory 112 may contain additional software applications such as first software application 115 and second software application 116 in some embodiments. In some embodiments of the invention, first software application 115 and second software application 116 may be stored on hard drives, CD-ROM, floppy disks, or other computer readable media typically used as storage 107.

Figure 2:
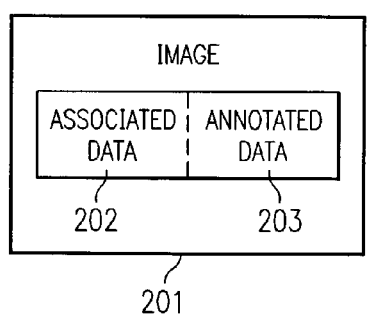
FIG. 2 shows a block diagram of image information in a format used by an embodiment of the present invention.

FIG. 2 shows a block diagram of image information in a format that may be used with the present invention. Image 201 may be a digital representation of a visual image, such as a scanned or digitally-captured image. Image 201 may be stored in a variety of well-known data formats, such as TIFF, PICT, PDF, JPEG, or XML. Other data formats now known or later developed may be used in other embodiments of the present invention. In some embodiments, image data may be converted to another format. Images may be stored in a one image-one file format, or may be stored in a multiple image-single file format. Image 201 may include one or more elements, such as pictures, graphics, text or other information.

Associated data 202 is data accompanying image 201, such as information that is descriptive of image 201. For example, images are often comprised of the image itself, plus a caption with information describing the image such as the named location of the image, the date that the image was captured, the name of the person who captured the image, or the Global Positioning System (GPS) location. Many other types of associated data 202 are available for use with the present invention. Associated data 202 may be contained in the same file as the image, or it may be contained in a file different from the image. In some embodiments, the associated data may be metadata.

Annotation data 203 as used in the present invention is data that has been created based upon associated data 202. For example, in one embodiment of the present invention, associated data 202 is analyzed to generate annotation data 203, which is then added to the file containing image 201 and associated data 202. In other embodiments, annotation data 203 may be directly added to image 201. It will be understood that in alternative embodiments, image 201, associated data 202 and annotated data 203 may be stored in a single file or in separate files having the same or different formats. If stored as separate files, the image 201, associated data 202 and annotated data 203 may be linked or otherwise related to each other to simply processing.

Figure 3:
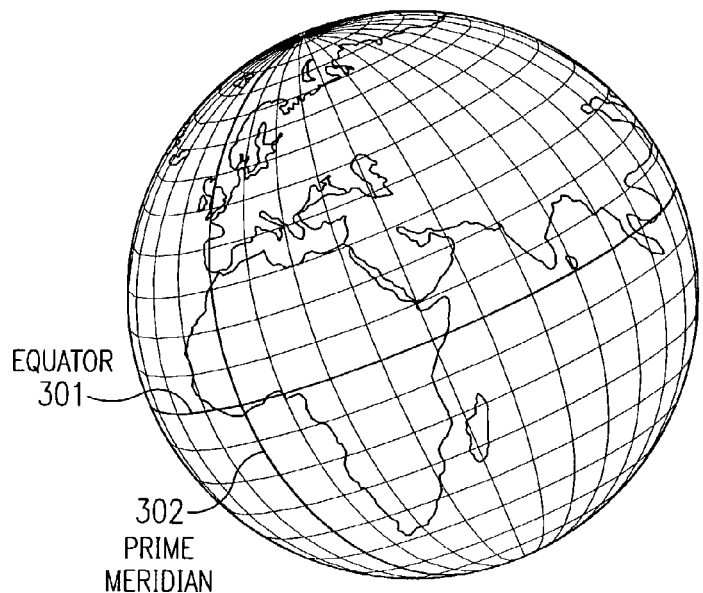
FIG. 3 shows a method of providing image location information according to an embodiment of the present invention.
Figure 4:
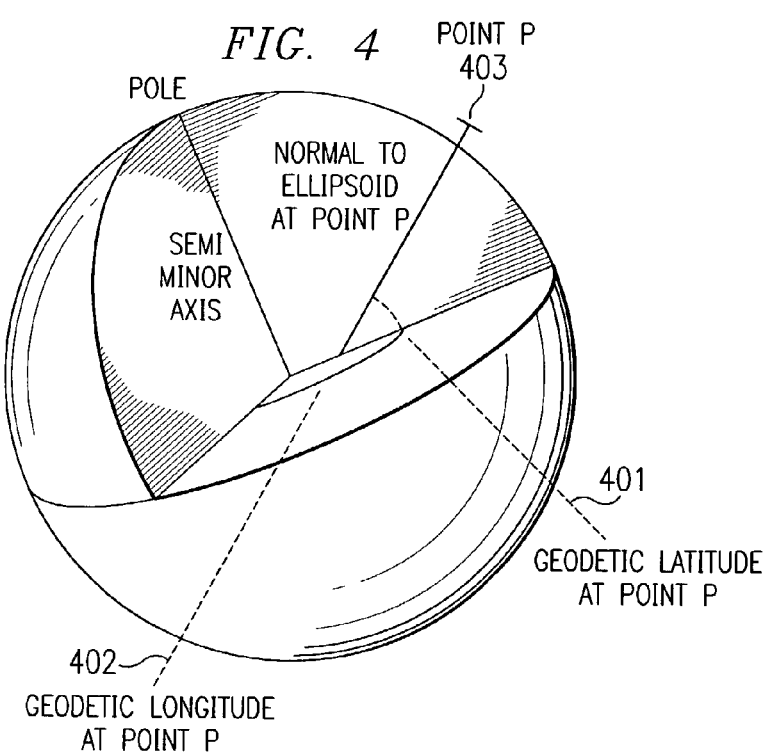
FIG. 4 shows another method of providing image location information according to an embodiment of the present invention.

FIGS. 3 and 4 show two methods of providing image location information according to embodiments of the present invention. In FIG. 3, a particular location on the surface of the Earth may be described by reference to that location's distance north or south from equator 301. This is known as the location's latitude. The location's distance east and west of prime meridian 302, that runs through Greenwich, Great Britain, is known as the location's longitude. In FIG. 4, a location may be described using geodetic XYZ coordinates, that describe a location in terms of its latitude, longitude, and height. A geodetic system describes a point in terms of geodetic latitude 401, geodetic longitude 402, and geodetic height 403. A three coordinate system as shown in FIG. 4 may include locations above and below the earth's surface that the two-coordinate system shown in FIG. 3 is unable to provide.

Figure 5:
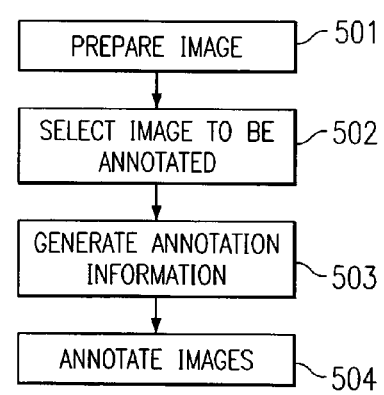
FIG. 5 shows a block diagram of the steps for a method for automatically generating image annotation information according to one embodiment of the present invention.

FIG. 5 shows the steps for a method for automatically generating image annotation information according to one embodiment of the present invention. In Step 501, an image may be prepared or captured. The image may be acquired directly using a digital acquisition device such as a digital camera or digital video camera, or may be generated from a non-digital source using a conversion device such as an electronic scanner. Electronic scanners may include, but are not limited to, desktop scanners, all-in-one devices, handheld scanners and the like. Non-digital sources may include black-and-white or color photographs, x-ray films, and other objects that are amenable to digital rendering. The image to be prepared in step 501 may be stored in an existing file using an image that was previously captured or created.

In Step 502, the image to be annotated is selected. A user may manually select an image to be annotated, or, in a preferred embodiment, the image selection may be performed automatically using computer software applications, such as PRECISIONSCAN or PRECISIONSCAN PRO from Hewlett-Packard Company. The selection of images in some embodiments may include the use of zoning analysis techniques that define image regions and region types. For example, in one embodiment, software may be employed that automatically differentiates between image regions containing text and image regions with picture or photo data and assigns those regions to different zones for further analysis. Such software is described in U.S. Pat. No. 6,151,426, herein incorporated by reference in its entirety. In some embodiments, differentiated regions that contain images may be automatically selected for annotation.

In Step 503, annotation information is generated from at least one of the images selected in Step 502. Annotation information may be information that describes images selected in Step 502, or may be information desired by the user to be associated with the selected images. In some embodiments, the generation of annotation information is automatic and may employ the selection of associated information such as image location information. In one embodiment, annotation information may be generated from associated information such as metadata or other data associated with, but extraneous to, an actual image. In another embodiment, annotation information is generated from text located proximally to the image selected in Step 502. In a preferred embodiment, zoning analysis may be used to locate proximal text.

In some embodiments, Optical Character Recognition (OCR) is used to convert image zones to text for use in generating annotation information. For example, an image, such as a picture, that contains text may be processed using an OCR application to capture the text from the image. The text may then be stored in a text format for use in generating annotation information.

Text selected for generating annotation information may be compared or matched to a database of information for conversion to other information of interest. A database may contain relevant text, terms, or expressions. For example, a picture of a bear may contain the words "grizzly bear" in the picture or as a caption. Using embodiments of the present invention, this text is identified as associated data. The words are then compared to a database, such as a database of common and scientific names of animal species, thereby locating the scientific name "ursus arctos." This name may be used as annotated data for the image.

In a preferred embodiment, annotation information comprises waypoint data that is generated by comparing location information that is associated with an image to a database of waypoint information. The location information may be, for example and not by way of limitation, the name of a place, and the waypoint information database may include data that associates places with street addresses, cities, states, countries, latitude and longitude information, or with other locations.

In Step 504, annotation information generated in Step 503 may be used to annotate the image selected in Step 501. Image data 201 may be annotated with annotation data 203 that is generated in Step 503, or, in a preferred embodiment, associated data 202 may be annotated. Annotation may require modification of an image data file or modification of data or files that associated with an image data file.

FIG. 6 shows a block diagram of the steps for a method of automatically selecting waypoint information for annotating an image according to one embodiment of the present invention. In Step 601, an image to be annotated is selected. A user may manually select an image to be annotated, or, in a preferred embodiment, the image selection may be performed automatically using computer software applications such as HEWLETT-PACKARD PRECISIONSCAN or PRECISIONSCAN PRO. In some embodiments, a collection of images may be selected, and each individual image in the collection may thereafter be selected for annotation. In a preferred embodiment, the image selected to be annotated may be an image of at least 75 pixels per inch ("ppi"). The user may select each image for annotation using a variety of manual methods such as point-and-click or keyboard selection of the desired image, or the image may be automatically selected by a computer system.

In Step 602, textual information that may describe the location of the image that has been selected may be located automatically using methods, such as zoning analysis, that identify regions of the selected image that contain textual information. In a preferred embodiment, textual information automatically located by zoning analysis may be stored for further use. In Step 603, the content of the image regions that are identified in Step 602 as containing textual information are analyzed. In a preferred embodiment, content analysis of textual information may include OCR processing to generate raw text that may be stored along with the zoning analysis information from Step 602. OCR analysis in a preferred embodiment uses textual information with a density of 300 ppi. Raw text may be stored in various formats, such as ASCII or Unicode, and may be stored separately or together with zoning region information from Step 602.

In Step 604, waypoint annotation information may be generated by comparing textual information from Step 603 analysis to a location database comprising, for example, various waypoints and corresponding location information. In Step 605, the image selected in Step 601 is annotated with the waypoint generated in Step 604.

FIG. 7 shows a flow diagram for annotating images with location information according to one embodiment of the invention. In Step 701, an embodiment according to the present invention may determine whether an image to be annotated is in digital format. In some embodiments a user may manually select the image format using a keyboard or other input device. If the image is not in digital format, than the image may be converted to digital format in Step 702. An image may be converted to digital format using a digital camera, a computer scanner, an all-in-one device, or other device that renders digital information from the physical copy of an image. In some embodiments, a user may be prompted to convert a non-digital image to a digital image. The image data may be stored in a variety of digital formats such as TIFF, PICT, PDF, JPEG, or XML.

In a preferred embodiment, image data may be stored or converted to TIFF format. A preferred embodiment may use 75-ppi images for zoning analysis, but may require 300-ppi 1-bit data if OCR will be used in the method. Separate files with image data rendered at different densities may be created in some embodiments. In a preferred embodiment, a 75-ppi, 24-bit image data file will created for zoning analysis and a separate 300-ppi, 1-bit data file will be created for OCR analysis. Image data may be stored on a variety of storage media such as CD-ROM, RAM memory, hard or floppy drives, or other storage methods. Conversion of image data to TIFF format may use a number of software routines commonly available and easily incorporated into the present method. Once an image has been converted to digital format in Step 702, the method may proceed to zoning analysis in Step 705.

If the image data is available in Step 701, then an embodiment according to the present invention in Step 703 may ascertain whether image region data is available. If image region data is not available, in Step 704 the image may be converted to a format suitable for zoning analysis. A preferred embodiment may use the TIFF file format or may convert other image formats to the TIFF format. Note that fully-digital documents in the XML and HTML file formats that are commonly used in Internet applications may not require conversion or zoning analysis because these formats contain built-in data tags, such as image/text tags that implicitly contain region data. Nevertheless, even for fully-digital documents, the image-associated text may still need to be searched for tagging, metadata, waypoint, or other image-associated information.

In Step 705, a preferred embodiment may use zoning analysis to generate region data for images that lack region data. Zoning analysis may provide information regarding the data types contained within an image. For example, in one embodiment, zoning analysis may locate, define and/or analyze text and image regions within an image. In a preferred embodiment, the text regions may be used as OCR input and the image regions may be used for matching with the text regions. In Step 703, if image region data is available, or if the data is in XML or HTML formats, then region data is used in Step 706.

In Step 706, text regions identified in Step 705 or contained in region information associated with the image may be analyzed with OCR to generate text data. OCR may be performed with a variety of software OCR applications such as those manufactured by HEWLETT-PACKARD, SCANSOFT, ABBYY, or I.R.I.S. that generate text in formats such as ASCII or Unicode. Text regions may be defined as illustrated in the following XML schema:

```
<?xml version="1.0" encoding="UTF-8"?>
<xsd:schema xmlns:xsd='http://www.w3.org/2001/XMLSchema'>
<xsd:schema>
<xsd:element name="TextRegion">
<xsd:complexType>
<xsd:element name="xmin" type='integer' minOccurs='1' maxOccurs='1'/>
<xsd:element name="xmax" type='integer' minOccurs='1' maxOccurs='1'/>
<xsd:element name="ymin" type='integer' minOccurs='1' maxOccurs='1'/>
<xsd:element name="xmax" type='integer' minOccurs='1' maxOccurs='1'/>
<xsd:element name="font size" type='integer' minOccurs='1' maxOccurs='1'/>
<xsd:element name="Text" type='string' minOccurs='1' maxOccurs='1'/>
... <!--other region data here-->
<xsd:element name="Location" type='string' minOccurs='1' maxOccurs='unbounded'?>
</xsd:complexTypes>
</xsd:element>
</xsd:schema>
``` which may have the XML data as follows:

```
<TextRegion>
    <xmin>1300</xmin><xmax>1900</xmax>
    <ymin>700</xmin><xmax>750</xmax>
    <font size>10</font size>
    <Text>Figure 1. Pikes Peak as viewed from the Garden of the Gods, Colorado Springs</Text>
...
</TextRegion>
```

This example contains an image with a text region extending in the x-direction from 1300 pixels from the left edge of the screen to 1900 pixels from the left edge of the screen (e.g. from 4⅓ inches to 6⅓ inches from the left side of the page) and from 700 pixels from the top of the screen to 750 pixels from the top of the screen in the y-direction (e.g. it is ⅙ of an inch tall). The text region in this example may be a photo credit, caption, title or some other information regarding the image. In Step 707, text regions are associated with image regions. In a preferred embodiment, text regions may be selected as a candidate for association with an image region based on proximity. Text regions close to an image region may be considered, as may be text regions that overlap with an image region. In text regions that overlap with image regions, some embodiments may also require that the text region contain text indicative of a caption, such as words like "figure", "image", "plate", "illustration", "photo", or "picture."

In Step 708, text from regions selected for association with an image may be analyzed, such as by using parts-of-speech tagging. Parts-of-speech analysis may be performed using natural language processing software, such as that produced by Cogilex, Hewlett-Packard Company, and others. Parts-of-speech analysis identifies words that are proper nouns and compares them to a database of words and locations. In a preferred embodiment, the parts-of-speech analysis identifies words that are proper nouns and then compares them to a waypoint database comprised of location names and associated waypoints. Alternatively, even without parts-of-speech tagging, every word or sequence of candidate words may be considered a candidate for the waypoint database.

An XML schema that would map a location name with a geodetic GPS waypoint may be of the type:

```
<?xml version="1.0" encoding="UTF-8"?>
<xsd:schema xmlns:xsd='http://www.w3.org/2001/XMLSchema'>
<xsd:schema>
<xsd:element name="Waypoint">
<xsd:complexType>
<xsd:element name="Location" type='string' minOccurs='1'
maxOccurs='unbounded'?>
<xsd:element name="GPS Data">
<xsd:complexType>
<xsd:element name="longitude" type='float' minOccurs='1'
maxOccurs='1'>
<xsd:element name="latitude" type='float' minOccurs='1'
maxOccurs='1'>
<xsd:element name="height" type='float' minOccurs='1'
maxOccurs='1'>
</xsd:complexType>
</xsd:element>
</xsd:complexType>
</xsd:element>
</xsd:schema>
```

Note that while the example uses GPS mapping coordinates, a preferred embodiment may contemplate any waypoint standard that is eventually adopted for global positioning information. Words identified by parts-of-speech analysis that match locations in a waypoint database may be further analyzed by weighting according to their usage. In a preferred embodiment, subject nouns are weighted higher than object nouns. In Step 709, words with the highest weighting in Step 708 may be used to annotate images associated with the text region from which the word was taken. In a preferred embodiment, words with the highest weighting may be compared to a waypoint database and used to generate waypoints. The waypoints may be used to annotate image data. An XML schema that would annotate an image region with a waypoint is as follows:

```
<TextRegion>
<xmin>1300</xmin><xmax>1900</xmax>
<ymin>700</xmin><xmax>750</xmax>
<font size>10</font size>
```

-continued

```
<Text>Figure 1. Pikes Peak as viewed from the Garden of the Gods,
Colorado Springs</Text>
...
<Location><name>Pikes
Peak</name><weight>1.0</weight></Location>
<Location><name>Garden of the
Gods</name><weight>0.5</weight></Location>
<Location><name>Colorado
Springs</name><weight>0.45</weight></Location>
<Location><name>Colorado</name><weight>0.4</weight></Location>
<Location><name>Rocky Mountain States, United
States</name><weight>0.35
</weight></Location>
<Location><name>United
States</name><weight>0.3</weight></Location>
<Location><name>North
America</name><weight>0.25</weight></Location>
</TextRegion>
```

Embodiments of the present invention may be implemented in many different ways. For instance, when implemented via computer-executable instructions or computer-executable software code, various elements of the system for generating annotated images are in essence software code that defines the operations of such various elements. The executable instructions or software code may be obtained from a computer-readable or processor-readable medium, such as hard drive media, optical media, EPROM, EEPROM, tape media, cartridge media, flash memory, ROM, memory stick, and/or the like. In other embodiments, the executable instructions or software code may be communicated via a data signal from a communication medium, such as the Internet, a Local Area Network (LAN), a Wide Area Network (WAN), an intranet or the like. In fact, readable media can include any medium that can store or transfer information.

The present invention may be embodied in software code or computer instructions that are operable on a computer system, such as system 101 (FIG. 1). For example, the steps discussed above with respect to FIGS. 5, 6 and 7 may be embodied in software instructions, computer program logic or other applications that may be stored in memory 112 and may run on processor 103. First and/or second software application 115, 116 may comprise computer instructions or software code for enabling the annotation of images using information associated with the images.

It shall be appreciated that the present invention is not limited to a particular system or architecture. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures now known or later developed that are capable of executing logical operations according to the embodiments of the present invention.

Moreover, it will be understood that in embodiments of the invention, the software instructions or computer code do not have to reside within a single computer program or product. For example, certain code for performing the invention may reside in a local device while other code for performing the invention resides on a remote device, such as a remote processor, server, memory or database. It will also be understood that the operations performed by software instructions or computer code may be executed in any order or at the same time. Furthermore, such instructions or code may be performed either serially or in parallel.

What is claimed is:

1. A method of generating image annotation information comprising:
   selecting images to be annotated;
   analyzing said selected images to identify associated information;
   generating annotation information from at least one of said selected images using said associated information; and
   annotating said selected images with the annotation information.

2. The method of claim 1 wherein said analyzing said selected images further comprises
   identifying associated information that is text.

3. The method of claim 1 wherein said analyzing said selected images further comprises:
   identifying associated information that is metadata.

4. The method of claim 1 wherein said generating annotation information further comprises
   generating waypoint information using associated location information.

5. The method of claim 1 wherein said generating annotation information further comprises:
   locating textual information and analyzing textual information; and
   analyzing textual information.

6. The method of claim 5 wherein said locating textual information further comprises:
   performing zoning analysis on said selected images.

7. The method of claim 5 wherein said analyzing textual information further comprises:
   performing parts-of-speech analysis on said textual information.

8. The method of claim 7 wherein said analyzing textual information further comprises:
   matching textual information to a database.

9. The method of claim 8 wherein said analyzing textual information further comprises:
   matching textual information to a database containing relevant text, terms, or expressions.

10. The method of claim 1 further comprising:
    generating waypoint annotation information.

11. The method of claim 1 wherein said selecting images further comprises:
    converting images.

12. A system for generating annotated images comprising:
    means for selecting images to be annotated;
    means for analyzing said selected images to identify associated information;
    means for generating annotation information for at least one selected image using said associated information;
    means for matching generated annotation information with selected images; and
    means for annotating images with generated annotation information.

13. The system of claim 12 wherein said means for generating annotation information comprises:
    means for generating region information.

14. The system of claim 12 wherein said means for analyzing said selected images further comprises:
    means for recognizing text information; and
    means for analyzing text information.

15. The system of claim 14 wherein said means for analyzing text information comprises:
    means for parts-of-speech analysis.

16. The system of claim 12 wherein said means for selecting images to be annotated further comprises:
    means for converting images.

17. Computer-executable software code stored on a computer-readable medium, said computer-executable software code comprising:
    code for selecting images to be annotated;
    code for identifying associated information in at least one selected image;
    code for generating annotation information using said associated information;
    code for matching annotation information with images to be annotated from the selected images; and
    code for annotating the matched images.

18. The computer-executable software code of claim 17 further comprising:
    code for generating images.

19. The computer-executable software code of claim 17 further comprising:
    code for sending and receiving images and annotated images over a network.

20. The computer-executable software code of claim 17 wherein said code for generating annotation information uses parts-of-speech analysis.

* * * * *